United States Patent [19]

Deserno et al.

[11] Patent Number: 4,613,757
[45] Date of Patent: Sep. 23, 1986

[54] METHOD FOR VISUALIZING A DOPED STRUCTURE IN UNDOPED ENVIRONMENT

[75] Inventors: Ulrich Deserno, Munich; Günther Schmidt, Freising, both of Fed. Rep. of Germany

[73] Assignee: Siemens Aktiengesellschaft, Berlin & Munich, Fed. Rep. of Germany

[21] Appl. No.: 648,781

[22] Filed: Sep. 10, 1984

[30] Foreign Application Priority Data

Sep. 28, 1983 [DE] Fed. Rep. of Germany ....... 3335129

[51] Int. Cl.$^4$ ............................................ G01N 21/64
[52] U.S. Cl. ............................ 250/458.1; 250/461.1; 250/459.1; 356/73.1
[58] Field of Search ................ 250/461.1, 372, 458.1, 250/459.1; 356/73.1

[56] References Cited

U.S. PATENT DOCUMENTS

| | | | |
|---|---|---|---|
| 3,297,873 | 1/1967 | Hovnanian et al. | 250/372 |
| 3,507,987 | 4/1970 | Van Den Bosch | 250/339 |
| 4,161,656 | 7/1979 | Marcuse et al. | 250/459.1 |
| 4,307,296 | 12/1981 | Presby | 250/459.1 |
| 4,362,943 | 12/1982 | Presby | 250/461.1 |

OTHER PUBLICATIONS

Ultraviolet Absorption of Titanium and Germanium in Fused Silica, Schultz, P. C.; XIth International Congress of Glass, Prague 1977.

*Primary Examiner*—Carolyn E. Fields
*Assistant Examiner*—Richard Hanig
*Attorney, Agent, or Firm*—Hill, Van Santen, Steadman & Simpson

[57] ABSTRACT

A method for visualizing the core of a monomode fiber by means of a microscope lens is disclosed, said monomode fiber comprising a jacket of undoped silica glass and its core of silica glass being doped with $GeO_2$ or $TiO_2$. An invisible microscope image of the core is generated in an image plane B with the microscope lens with ultraviolet light from the wavelength range between 230 nm and 380 nm and the invisible image is converted into a visible image by means of a video system, whereby the clear contrast contained in the invisible microscope image which is based upon the employment of the ultraviolet light is preserved in the visible image.

9 Claims, 1 Drawing Figure

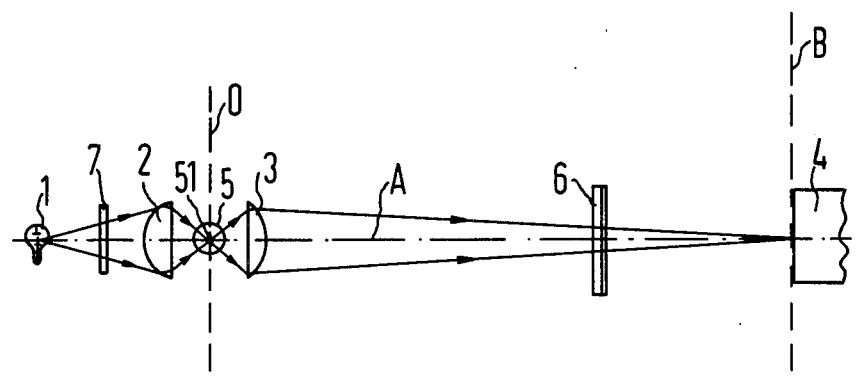

METHOD FOR VISUALIZING A DOPED STRUCTURE IN UNDOPED ENVIRONMENT

BACKGROUND OF THE INVENTION

1. Field of the Invention

The present invention relates to a method for visualizing a doped structure in an undoped environment using a microscope lens.

2. State of the Art

An example of a doped structure in an undoped environment is a core of doped silica glass in a monomode fiber comprised of a jacket of undoped silica glass that surrounds such a core.

Optical transmission links with monomode fibers make particular demands of the quality and reproducibility of fiber splices. In order to assure a constantly high quality of such splice connection, a careful alignment of the fiber cores before and during the actual splicing operation is necessary. One prior art method for aligning the fiber cores is the minimization of the transition attenuation given longitudinal transirradiation of the splice location. This method requires high outlay for coupling the monitoring beam in and out. Methods are therefore required wherein the cores of monomode fibers can be made visible with transillumination perpendicular to the fiber axis so that a visual alignment is enabled.

Microscopy at monomode fiber cores, however, is problematical because the core of monomode fibers as well as the surrounding material are highly transparent to visible light. The phase fronts of a light wave perpendicularly traversing the core are only slightly deformed by the small refractive index difference, which amounts to about 0.1%, and by the small core diameter. Such slight phase differences can be converted into usable light/dark contrast in the microscope image only with great outlay.

Such analysis applies generally to transparent doped structures in a transparent undoped environment.

BRIEF SUMMARY OF THE INVENTION

This invention relates to techniques for visualizing a transparent doped structure such as a core of doped silica glass in a monomode fiber, by means of a microscope lens, whereby invisible light generates a contrast in a microscope image of the structure.

A primary object of the present invention is to disclose how, given a method of the type initially cited, the contrast in a microscope image of the structure can be heightened in a simple and reliable manner.

A clear contrast enhancement in an initially invisible microscope image is achieved which allows for simple evaluation by means of the inventive method.

A simple and practical type of evaluation is accomplished by converting an invisible microscope image into a visible image for evaluating. Given contrast-preserving conversion, the doped structure stands out clearly from the environment: for example, as a dark structure against a light environment.

Other and further objects, aims, purposes, features, advantages, applications and the like will be apparent to those skilled in the art from the teachings of the present specification taken with the accompanying drawings.

BRIEF DESCRIPTION OF DRAWINGS

The FIGURE shows an illustration of one embodiment of apparatus (schematically and not to scale) for the visualization of the core of a monomode fiber according to the method of this invention.

DETAILED DESCRIPTION

As already indicated, the inventive method is suited for the visualization of the core of a monomode fiber. When the monomode fiber consists of silica glass overall, and wherein the core of silica glass is doped with GeO or $TiO_2$, an invisible microscope image of the core is expediently produced with UV (ultraviolet) light whose spectral characteristic is matched to the absorption behavior of the dopants employed. In this wavelength range, the silica doped with $GeO_2$ as well as the silica doped with $TiO_2$, exhibits an absorption band that is missing with undoped silica (see in this regard, P. C. Schultz, "UV-Absorption of Ge and Ti in fused silica", XIth Congress of Glass, Prague 1977).

In order to make such a core doped with $GeO_2$ visible, ultraviolet light from the wavelength range extending from 230 nm through 380 nm is expediently employed. Given observation in this wavelength range, the core appears dark against a light environment.

Given the central wavelength of 242 nm in the said wavelength range and given 5% $GeO_2$ doping, a 5% darkening of the core is achieved given irradiation of a 10 $\mu$m thick fiber core. A significant additional advantage is achieved in that twice as high a topical resolution is achieved because of the shorter light wavelength.

The ultraviolet light is advantageously generated with a mercury high-pressure lamp in combination with a narrow-band filter which is transmissive for the appertaining UV wavelength range. A mercury lamp is particularly well-suited for cores doped with $GeO_2$ because mercury has a strong emission line ($6^3 P_0 - 8^3 D_1$) at 238 nm.

Given employment of ultraviolet light, the invisible microscope image is expediently generated with a UV microscope lens consisting of silica glass.

The invisible microscope image is advantageously evaluated with a video system. The utilization of a video system not only enables conversion into a visible image, but also enables fatigue-free work over a longer time span.

In one application, the inventive method is advantageously applied in the inspection of transparent fibers and preforms of such fibers and in the supervision of the fiber geometry during fiber drawing, particularly for quality control.

The invention is further explained by way of example in reference to the accompanying figure.

The illustrated apparatus comprises a mercury high-pressure vapor lamp 1, a condensor lens 2, schematically shown as an einzel-lens, a microscope lens 3 schematically shown as an einzel-lens, and a camera tube 4 of a video system. The optical axis of the optical system is referenced A.

The light of the mercury high-pressure vapor lamp 1 is focused by the condensor lens 2 in a plane O which lies perpendicular to the optical axis and which simultaneously forms a specimen plane in the object space of the microscope lens 3. This specimen plane O has an image plane B in the object space of the microscope lens 3 allocated to it, and an intermediate microscope image of a specimen lying in the specimen plane O is generated therein. The light-sensitive image exposure surface of the camera tube 4 is disposed in the image plane B in the region of the intermediate microscope image.

The mercury high-pressure vapor lamp 1 generates UV light from the wavelength range extending from about 230 nm through 380 nm, particularly at 238 nm, and the lenses of the condensor lens 2 and of the microscope lens 3 consist of silica glass which is transmissive for light having such a wavelength. Accordingly, the camera tube 4 must be sensitive to this light. A filter 7 is conveniently disposed between lamp 1 and lens 2.

The core 51 of a monomode fiber 5 is disposed in the specimen plane O such that it lies in the focal point of the focus generated by the condensor lens 2. The monomode fiber 5 is disposed, for example, such that its axis proceeds perpendicular to the plane of the drawing and intersects the optical axis A. Its jacket consists of undoped silica glass, whereas its core 51 consists of silica glass which, for example, is doped with 5% $GeO_2$. The diameter of the core 51 amounts, for example, to 10 μm.

An absorption band of the silica glass doped with $GeO_2$ which is missing in undoped silica glass, lies in the said wavelength range. For this reason, the doped core 51 is imaged in the image plane B with clear contrast relative to its environment in the intermediate microscope image. Since this image is invisible to the human eye, it is evaluated via the camera tube 4. The evaluation can, for example, ensue electronically, and can by this means be made directly visible. Alternatively, it can, however, also be made directly visible on a video monitor, whereby an intermediate magnificantion is achievable which corresponds, for example, to the magnification of a microscope eyepiece, is also expediently undertaken. The imaged core in the converted visible image clearly contrasts with its environment as a consequence of the noticeable contrast in the invisible intermediate microscope image.

Position 6 indicates a plano-convex cylindrical lens whose axis perpendicularly intersects the optical axis A and proceeds perpendicularly to the longitudinal axis of the monomode fiber 5. This lens 6 likewise consists of silica glass and serves for the compensation of the image-deteriorating influence of the refractive, outer circumferential surface of the monomode fiber 5.

Other and further aims, objects, purposes, advantages, uses and the like for the present invention will be apparent to those skilled in the art from the present specification.

We claim:

1. A method for making the doped core of a monomode fiber having a longitudinal axis visible, said method comprising the steps of:
   (A) generating with invisible light and a microscope objective lens means a microscope image of said doped core, said image being projected along a beam path having an optical axis which intersects said fiber longitudinal axis, said invisible light being characterized by having a wavelength range in which the spectral adsorption of the doped core differs noticeably from the spectral absorption of the undoped environment,
   (B) positioning a plano-convex cylindrical lens having a longitudinal axis in said beam path so that said lens longitudinal axis perpendicularly intersects said optical axis and extends perpendicularly to said fiber longitudinal axis, and
   (C) evaluating such microscope image through said lens.

2. The method of claim 9 wherein said invisible microscope image is converted into a visible image for said evaluating.

3. The method of claim 2 wherein said transparent doped structure comprises a silica glass fiber whose core is doped with $GeO_2$ or $TiO_2$, characterized in that such an invisible microscope image of said core is generated with ultraviolet light whose spectral characteristic is matched to the absorption behavior of the dopants employed.

4. The method of claim 3, wherein said ultraviolet light has a wavelength range from 230 μm through 380 μm is employed for the visualization, and said core is doped with $GeO_2$.

5. The method of claim 4, wherein said ultraviolet light is generated with a mercury high-pressure lamp and is passed through a narrow-band filter which is transmissive for said ultraviolet wavelength range.

6. The method according to claim 3, wherein said invisible microscope image is produced with an ultraviolet microscope lens consisting of silica glass.

7. The method of claim 2 wherein said invisible microscope image is evaluated with a video system.

8. The method of claim 3 wherein said transparent doped structure comprises a preform of such fiber and fiber geometry is monitored when drawing fibers using such visible image.

9. Apparatus for evaluating the doped core of a monomode fiber, said apparatus comprising:
   (A) supporting means for such a monomode fiber,
   (B) a microscope objective lens means for generating with invisible light a microscope image of such doped core, said image being projected along a beam path having an optical axis which intersects the fiber longitudinal axis, the invisible light generated being characterized by having a wavelength range in which the spectral absorption of the doped core differs noticeably from the spectral absorption of the undoped environment, and
   (C) a plano-convex cylindrical lens positioned in said beam path, including supporting means therefore, said lens being oriented with its longitudinal axis perpendicularly intersecting said optical axis and also extending perpendicularly to said fiber longitudinal axis.

* * * * *